(12) United States Patent
Koganehira et al.

(10) Patent No.: US 7,604,692 B2
(45) Date of Patent: Oct. 20, 2009

(54) INK COMPOSITION FOR INK JET RECORDING, RECORDING METHOD, AND RECORDED MATTER

(75) Inventors: Shuichi Koganehira, Matsumoto (JP); Hironori Sato, Shiojiri (JP); Akira Mizutani, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/011,445

(22) Filed: Jan. 25, 2008

(65) Prior Publication Data
US 2008/0213548 A1    Sep. 4, 2008

(30) Foreign Application Priority Data
Jan. 26, 2007    (JP)    ............................. 2007-016841

(51) Int. Cl.
C09D 11/02    (2006.01)
B41J 2/01    (2006.01)

(52) U.S. Cl. .............. 106/31.58; 106/31.43; 106/31.59; 106/31.75; 106/31.86; 106/31.89; 347/100

(58) Field of Classification Search .............. 106/31.58, 106/31.86, 31.59, 31.88, 31.43, 31.75; 347/100
See application file for complete search history.

(56) References Cited

U.S. PATENT DOCUMENTS

| | | | |
|---|---|---|---|
| 7,052,536 B2 * | 5/2006 | Yatake | 106/31.58 |
| 7,135,208 B2 * | 11/2006 | Kubota | 106/31.86 |
| 7,517,399 B2 * | 4/2009 | Sato et al. | 106/31.58 |
| 2004/0024086 A1 * | 2/2004 | Segawa et al. | 523/160 |
| 2006/0266260 A1 * | 11/2006 | Yatake | 106/31.86 |
| 2007/0159516 A1 * | 7/2007 | Sato et al. | 106/31.59 |
| 2007/0242119 A1 * | 10/2007 | Koganehira et al. | 106/31.89 |
| 2007/0247504 A1 * | 10/2007 | Koganehira et al. | 106/31.58 |

FOREIGN PATENT DOCUMENTS

JP    2005-194500    7/2005
JP    2005-307184    11/2005

* cited by examiner

*Primary Examiner*—Helene Klemanski
(74) *Attorney, Agent, or Firm*—Nutter McClennen & Fish LLP; John J. Penny, Jr.

(57) ABSTRACT

There is provided an ink composition for ink jet recording, which can yield images having excellent gloss with good color reproduction even on various recording media having a low level of water absorption, especially synthetic paper and printing paper for running-on. The ink composition for ink jet recording comprises a colorant, water, an alkanediol, and a surfactant, wherein the alkanediol comprises a water-soluble 1,2-alkanediol, a poor water-soluble 1,2-alkanediol, and a poor water-soluble both terminal alkanediol, and the alkanediol satisfies a requirement on a weight basis of A:(B+C)=2:1 to 2:3 wherein A represents the content of the water-soluble 1,2-alkanediol in the alkanediol; B represents the content of the poor water-soluble 1,2-alkanediol in the alkanediol; and C represents the content of the poor water-soluble both terminal alkanediol in the alkanediol.

26 Claims, 1 Drawing Sheet

INK COMPOSITION FOR INK JET RECORDING, RECORDING METHOD, AND RECORDED MATTER

BACKGROUND OF THE INVENTION

1. Field of Invention

The present invention relates to an ink composition for ink jet recording, which, even on various recording media having a low level of water absorption, especially synthetic paper and printing paper for running-on, can yield images having excellent gloss with good color reproduction, and a method for ink jet recording using the ink composition.

2. Background Art

Ink jet recording is a printing method wherein droplets of an ink are ejected and deposited on recording media, such as paper, to perform printing. An innovative advance of a recent ink jet recording technique has made it possible to realize, by ink jet recording, the production of images having quality comparable to images yielded by high-definition printing realized only by silver salt photography or offset printing. This trend has led to the development of inks for ink jet recording that can realize images having a high level of glossy impression comparable to the gloss of images produced by silver salt photography, using the so-called specialty papers which are recording media having a high level of gloss comparable to photographic paper, art paper and the like used in the field of silver salt photography and offset printing. Further, inks for ink jet recording which can realize image quality comparable to the image quality of images produced by silver salt photography even on plain paper, have also been developed.

Inks, which have been generally used for ink jet recording, are water-based inks that comprise water as a main component and a colorant and various additives. Regarding the colorant, the development of pigment-based inks utilizing the properties of the pigment has recently been forwarded because pigments are superior to dyes in weatherfastness properties such as lightfastness, gasfastness, waterfastness, and moisturefastness. For example, Japanese Patent Laid-Open No. 194500/2005 discloses a pigment-based ink having reduced feathering or bleeding properties and excellent gloss on specialty papers that have been realized by using a polysiloxane compound as a surfactant and adding an alkanediol such as 1,2-hexanediol as a solubilizer additive to the ink. Further, Japanese Patent Laid-Open No. 307184/2005 discloses that an ink, which has excellent ejection stability and can be evenly printed on recording media, can be produced by adding an alcohol having a specific chain length and an acetylene glycol surfactant to the ink.

The widespread use of techniques for forming images from digital data in recent years has led to an increased need for digital color proofs (DTPs) particularly in the field of printing, and an ink jet recording method has also become applied to DTPs. The color reproduction and stability reproduction of printed matters are required of DTPs. Accordingly, when proofs are prepared by the ink jet recording method, specialty paper for ink jet recording has been generally used.

In applications for color proof, however, ink jet recording on printing paper for running-on rather than specialty papers has been desired. Further, it is considered that proof cost can be significantly reduced if printed matter produced by ink jet recording directly on printing paper for running-on can be used as a final proof sample without use of any specialty paper.

The printing paper for running-on is a coated paper having on its surface a coating layer for receiving an oil-based ink. In the printing paper for running-on, however, the capability of the coating layer to absorb ink is disadvantageously poor. Therefore, when water-based pigment inks, which have been generally used in ink jet recording, are used, the penetrability of the inks into recording media (printing paper for running-on) is so low that feathering or bleeding or uneven coagulation sometimes occurs in images.

Further, in recent years, synthetic papers, which have been widely used in printing fields, produced by mixing an inorganic filler and the like into a polyethylene resin or a polyester resin and forming the mixture into a film have excellent recycle properties and have drawn attention as environmentally friendly materials.

Synthetic papers, however, generally have poor water absorption. Accordingly, when water-based inks are used, the ink overflows on a yielded image and sometimes causes feathering or bleeding or uneven coagulation as in the case of printing paper for running-on.

SUMMARY OF THE INVENTION

The prevent inventors have proposed in a previous application (Japanese Patent Application No. 328766/2005) the addition of two types of alkanediols, that is, a water-soluble 1,2-alkanediol and a poor water-soluble both terminal alkanediol, as a dissolution aid in a surfactant-containing ink composition for ink jet recording can realize images having excellent gloss with good color reproduction even on recording media having a low level of water absorption, for example, printing paper for running-on. The present inventors have now found that the addition of a poor water-soluble 1,2-alkanediol in addition to a poor water-soluble both terminal alkanediol can realize images having excellent gloss with good color reproduction even on synthetic paper and printing paper for running-on which have poor ink absorption. The present invention has been made based on such finding.

Accordingly, an object of the present invention is to provide an ink composition for ink jet recording, which can yield images having excellent gloss with good color reproduction, on various recording media, especially even on synthetic paper and printing paper for running-on which have poor ink absorption.

The above object can be attained by an ink composition for ink jet recording, comprising a colorant, water, an alkanediol, and a surfactant, wherein the alkanediol comprises a water-soluble 1,2-alkanediol, a poor water-soluble 1,2-alkanediol, and a poor water-soluble both terminal alkanediol.

The present invention can realize an ink composition for ink jet recording, which can yield images having excellent gloss with good color reproduction even on synthetic paper and printing paper for running-on which are poor in ink absorption.

DETAILED DESCRIPTION OF THE INVENTION

Figure 1:
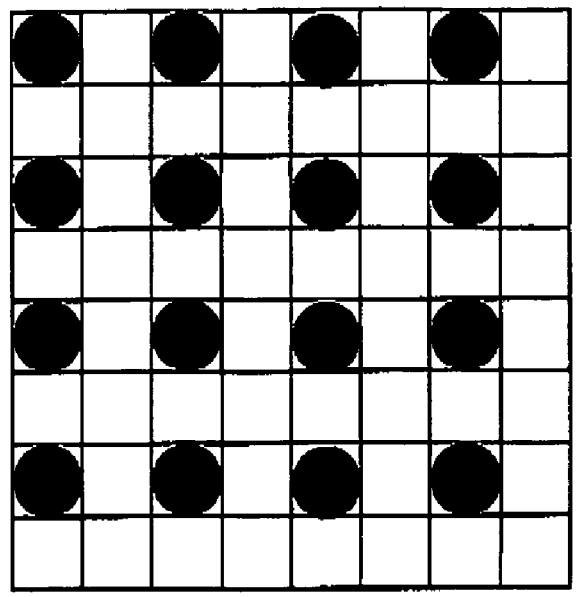
FIG. 1 is a schematic diagram showing dot layout i used in a working example.
Figure 2:
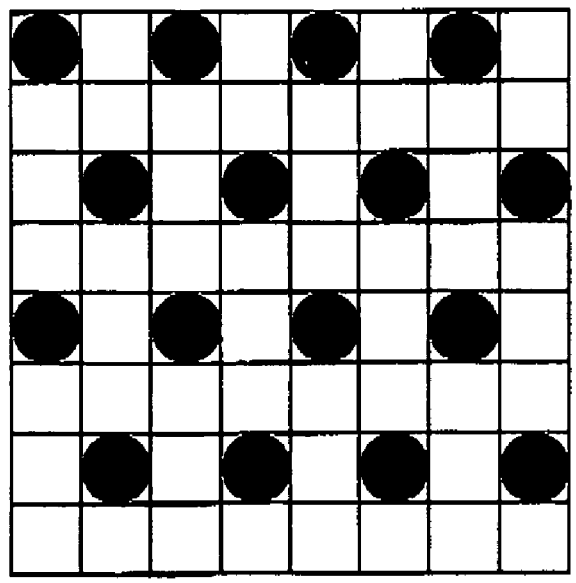
FIG. 2 is a schematic diagram showing dot layout ii used in a working example.

The ink composition for ink jet recording according to the present invention comprises a colorant, water, an alkanediol, and a surfactant, wherein the alkanediol comprises a water-soluble 1,2-alkanediol, a poor water-soluble 1,2-alkanediol, and a poor water-soluble both terminal alkanediol. Each component will be described.

<Definition>

In the present specification, the alkanediol may be in a straight chain or branched chain form.

The term "poor water-soluble" as used herein means that the solubility in water (amount of solute in 100 g of water) is less than 1 g.

<Alkanediol>

The alkanediol used in the ink composition for ink jet recording according to the present invention comprises at least three alkanediols, i.e., a water-soluble 1,2-alkanediol, a poor water-soluble 1,2-alkanediol, and a poor water-soluble both terminal alkanediol, and the alkanediol satisfies a requirement on a weight basis of A:(B+C)=2:1 to 2:3 wherein A represents the content of the water-soluble 1,2-alkanediol in the alkanediol; B represents the content of the poor water-soluble 1,2-alkanediol in the alkanediol; and C represents the content of the poor water-soluble both terminal alkanediol in the alkanediol. When a solvent containing these three types of alkanediols in specific proportions is used as a dissolution aid for the surfactant, images having excellent gloss and good color reproduction can be realized even on recording media having a low level of water absorption such as synthetic paper and printing paper for running-on. The reason for this has not been fully elucidated yet but is believed to be as follows.

As described above, in conventional high-penetration inks for ink jet recording, the use of water-soluble 1,2-alkanediols such as 1,2-hexanediol or 4-methyl-1,2-pentanediol is preferred from the viewpoint of lowering the surface tension of ink to reduce feathering or bleeding. When a substituent-free straight chain alkanediol such as 1,2-hexanediol is solely added, the viscosity of ink is increased and, thus, the ink weight of dots is reduced. As a result, close control of ink weight of dots is difficult, and, upon the ejection of ink from the head, unfavorable phenomena sometimes occur such as a shift in impact position of ink droplets, misting of ink, and poor print durability, often leading to lowered color development and collapse of dot shape. Accordingly, uneven coagulation and color-to-color bleeding take place, and, further, the unfavorable phenomena are causative of a printing failure.

Further, when a branched alkanediol such as 4-methyl-1,2-pentanediol or 3,3-dimethyl-1,2-butanediol is solely added, uneven coagulation or unsatisfactory drying occurs although an increase in viscosity of ink can be suppressed. The reason for this has not been fully elucidated yet but is believed to be as follows.

In ink jet recording, a transient penetration period exists in which, upon the deposition of ink droplets onto a recording medium, a surfactant is selectively and preferentially penetrated into a recording medium and, consequently, the relative amount of the surfactant in the ink droplets, which stay on the surface of the recording medium, becomes insufficient. It is considered that, in the transient penetration period, since the surface tension of the ink is rapidly increased, the ink, which cannot be penetrated into the recording medium, stays on the recording medium resulting in coagulation spots formation and unsatisfactory drying. It is particularly considered that, when a conventional alkanediol-containing ink is applied to a recording medium having a low level of ink absorption, due to a low level of ink absorption in the recording medium, the ink weight (colorant amount)/inch/m$^2$ is reduced resulting in deteriorated color reproduction.

In the present invention, a combination of the water-soluble 1,2-alkanediol with the poor water-soluble 1,2-alkanediol with the poor water-soluble both terminal alkanediol is used as the dissolution aid for the surfactant. The combined use of the specific alkanediols which are not soluble or are hardly soluble in water can suppress an increase in viscosity of the ink and can increase the amount of ink absorbed in the recording medium. It is considered that, even when recording media having a low level of ink absorption such as synthetic paper or printing paper for running-on are used, the use of the solvent containing the three types of alkanediols in the above-defined respective amount ranges as the dissolution aid for the surfactant can realize excellent printing stability and print quality and the production of images having excellent gloss and good color reproduction.

In this connection, it should be noted that, when the addition amount of the poor water-soluble 1,2-alkanediol and the poor water-soluble both terminal alkanediol is increased, in some cases, these alkanediols are not fully dissolved in the ink containing water as a solvent. In the present invention, preferably, the ink comprises a pigment as a colorant and a dispersing agent described later, which can disperse and/or dissolve the pigment. The dispersing agent present in the ink functions as a dissolution aid for the poor water-soluble 1,2-alkanediol and the poor water-soluble both terminal alkanediol and thus can fully dissolve these alkanediols in the ink.

In the present invention, preferably, the water-soluble 1,2-alkanediol has 6 or less carbon atoms. Among them, water-soluble branched 1,2-alkanediols are preferred. 1,2-Alkanediols having one or two substituents on its main chain are particularly preferred.

In 1,2-alkanediols having one or two substituents on its main chain, the substituent is preferably an alkyl group, more preferably C1 to C4 alkyl group. The carbon length of the alkanediol is preferably C3 to C8, more preferably C5 or C4. Specific examples of preferred alkanediols include 4-methyl-1,2-pentanediol, 3,3-dimethyl-1,2-butanediol, 4,4-dimethyl-1,2-pentanediol, 4-methyl-1,2-hexanediol, and 5-methyl-1,2-hexanediol. Among them, 4-methyl-1,2-pentanediol and 3,3-dimethyl-1,2-butanediol are particularly preferred.

The content of the 1,2-alkanediol having one or two substituents on the main chain thereof is preferably 1.0 to 15.0% by weight, more preferably 2.0 to 4.0% by weight, based on the whole ink composition. When the content of the 1,2-alkanediol having one or two substituents on the main chain thereof is in the above-defined range, the viscosity of the ink is lower than that of the ink containing a substituent-free straight-chain 1,2-alkanediol and, at the same time, the ejection stability is improved and uneven coagulation is reduced. When the 1,2-alkanediol having one or two substituents on its main chain is contained in an amount above the upper limit of the above-defined amount range, an extreme viscosity increase occurs, often leading to a deterioration in ejection stability. Further, in a recorded matter using media having poor ink absorption, in some cases, drying properties are poor, and, thus, printed matters cannot be placed on top of each other without difficulties.

In another embodiment of the present invention, when a fluorene resin, which will be described later, is contained as a pigment dispersant in the ink composition, the water-soluble 1,2-alkanediol is preferably of a straight chain type, particularly preferably 1,2-pentanediol. When a combination of the fluorene resin with 1,2-pentanediol is used, the viscosity of the ink is lower than the viscosity of the ink containing the 1,2-alkanediol having one or two substituents on its main chain and, further, the ejection stability is also improved, contributing to reduced uneven coagulation.

When the fluorene resin is contained as the dispersing agent, the content of 1,2-pentanediol is preferably 1.0 to 15.0% by weight, more preferably 2.0 to 8.0% by weight, based on the whole ink composition.

In the present invention, the poor water-soluble 1,2-alkanediol is preferably of a straight chain type. The carbon length of the poor water-soluble straight chain 1,2-alkanediol is preferably C8 to C16, more preferably C8 to C10. Specific examples of such poor water-soluble 1,2-alkanediols include 1,2-octanediol, 1,2-nonanediol, and 1,2-decanediol. Among them, 1,2-octanediol is particularly preferred.

The content of the poor water-soluble 1,2-alkanediol is 0.1 to 4.0% by weight, more preferably 0.5 to 2.0% by weight, based on the whole ink composition. When the content of the poor water-soluble 1,2-alkanediol is in the above-defined range, the occurrence of coagulation spots can be suppressed while ensuring ejection stability and low viscosity, contributing to further improved color reproduction. The incorporation of the poor water-soluble 1,2-alkanediol in an amount above the upper limit of the above-defined amount range is likely to cause separation of the poor water-soluble 1,2-alkanediol in the ink and causes a remarkable lowering in surface tension, often resulting in deteriorated ejection stability. Further, in recording media, an increase in coverage per unit weight takes place which is unfavorable from the viewpoint of graininess.

The poor water-soluble both terminal alkanediol is preferably of a branched type. The use of a both terminal alkanediol having one or two substituents on its main chain is particularly preferred.

In the both terminal alkanediol having one or two substituents on its main chain, preferably, all the substituents are an alkyl group, more preferably a C1 to C4 alkyl group. The alkyl groups as the two substituents may be the same or different. The carbon length of the alkanediol is preferably C3 to C8, more preferably C3. Specific examples of such alkanediols include 2-methyl-2-propyl-1,3-propanediol, 2-ethyl-2-butyl-1,3-propanediol, 2-butyl-2-methyl-1,3-propanediol, 2-butyl-2-ethyl-1,3-propanediol, and 2,2-dibutyl-1,3-propanediol. Among them, 2-butyl-2-methyl-1,3-propanediol and 2-butyl-2-ethyl-1,3-propanediol are particularly preferred.

The content of the both terminal alkanediol having one or two substituents on its main chain is preferably 0.1 to 4.0% by weight, more preferably 0.5 to 2.0% by weight, based on the whole ink composition. When the content of the both terminal alkanediol having one or two substituents on its main chain is in the above-defined range, the ejection stability is improved and coagulation spots can be suppressed. As a result, color reproduction can be further improved. Further, in recording media, since drying is carried out in an incompatible state, the surface drying property can be significantly improved. Accordingly, this is very advantageous in that traces caused by the transfer of recording media do not remain. When the both terminal alkanediol having one or two substituents on its main chain is contained in an amount above the upper limit of the above-defined range, the both terminal alkanediol is likely to be separated, often resulting in deteriorated ejection stability. Further, since the level of the incompatible state is increased, in some cases, the color development of recorded matter in printing paper for running-on is a whitish one.

In the present invention, the ratio of the content of the water-soluble 1,2-alkanediol to the poor water-soluble 1,2-alkanediol is preferably 2:1 to 4:1 on a weight basis. When the mixing ratio is in the above-defined range, the poor water-soluble alkanediol is not separated and is stabilized in the ink composition. When the water-soluble 1,2-alkanediol is a substituent-free straight-chain 1,2-hexanediol, the ratio of the content of the water-soluble 1,2-alkanediol to the poor water-soluble 1,2-alkanediol is preferably 2:1 to 4:1 on a weight basis. When the mixing ratio is in the above-defined range, uneven coagulation can be further reduced.

In the present invention, the ratio of the content of the water-soluble 1,2-alkanediol to the poor water-soluble both terminal alkanediol is preferably 2:1 to 4:1 on a weight basis. When the mixing ratio is in the above-defined range, the poor water-soluble both terminal alkanediol is not separated and is stabilized in the ink composition. When the water-soluble 1,2-alkanediol is a substituent-free straight-chain 1,2-hexanediol, the ratio of the content of the water-soluble 1,2-alkanediol to the poor water-soluble both terminal alkanediol is preferably 2:1 to 4:1 on a weight basis. When the mixing ratio is in the above-defined range, uneven coagulation can be further reduced.

The above three types of alkanediols preferably satisfy a requirement of A:B5:C=2:1:1 to 4:1:1 or 3:1:2 to 2:1:2 wherein A represents the content of the water-soluble 1,2-alkanediol; B represents the content of the poor water-soluble 1,2-alkanediol; and C represents the content of the poor water-soluble both terminal alkanediol. When this requirement is satisfied, low viscosity, high color development, ejection stability and good drying property of recorded matter can be realized. The total amount of the alkanediols is preferably 2.0 to 1.2.0% by weight, more preferably 3.0 to 6.0% by weight, based on the whole ink.

<Colorant>

Any of dyes and pigments may be used as the colorant in the ink composition for ink jet recording according to the present invention. However, pigments are preferred from the viewpoints of lightfastness and waterfastness.

Inorganic pigments and organic pigments are usable as the pigment. The inorganic pigments and the organic pigments may be used either solely or as a mixture of two or more.

Inorganic pigments include, for example, in addition to titanium oxide and iron oxide, carbon blacks produced by known processes, such as contact, furnace, and thermal processes. Organic pigments usable herein include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye-type chelate pigments (for example, basic dye-type chelate pigments and acid dye-type chelate pigments), nitro pigments, nitroso pigments, and aniline blacks.

Pigments used may be properly selected depending upon the type (color) of the contemplated ink composition. Specific examples of pigments for yellow ink compositions include C.I. Pigment Yellow 1, C.I. Pigment Yellow 2, C.I. Pigment Yellow 3, C.I. Pigment Yellow 12, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 128, C.I. Pigment Yellow 129, C.I. Pigment Yellow 138, C.I. Pigment Yellow 139, C.I. Pigment Yellow 147, C.I. Pigment Yellow 150, C.I. Pigment Yellow 151, C.I. Pigment Yellow 154, C.I. Pigment Yellow 155, C.I. Pigment Yellow 180, and C.I. Pigment Yellow 185. They may be used either solely or in a combination of two or more. The use of one or at least two pigments selected from the group consisting of C.I. Pigment Yellow 74, C.I. Pigment Yellow 110, C.I. Pigment Yellow 128, and C.I. Pigment Yellow 147 is particularly preferred. Specific examples of pigments for magenta Ink compositions include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 168, C.I. Pigment Red 184, C.I. Pigment Red 202, C.I. Pigment Red 209, and C.I. Pigment Violet 19. They may be used either solely or in a combination of two or more. The use of one or at least two pigments selected from the group consisting of C.I. Pigment Red 122, C.I. Pigment Red 202, C.I. Pigment Red 209, and C.I. Pigment Violet 19 is particularly preferred. Specific examples of pigments for cyan ink compositions include C.I. Pigment Blue 1, C.I. Pigment Blue 2, C.I. Pigment Blue 3, C.I. Pigment Blue 15:3, C.I. Pigment Blue 15:4, C.I. Pigment Blue 15:34, C.I. Pigment Blue 16, C.I. Pigment Blue 22, and C.I. Pigment Blue 60; and C.I. Vat Blue 4 and C.I. Vat Blue 60. They may be used either solely or in a combination of two or more. The use of C.I. Pigment Blue 15:3 and/or C.I. Pigment Blue 15:4 is particularly preferred. C.I. Pigment Blue 15:3 is still more preferred.

Specific examples of pigments for black ink compositions include inorganic pigments, for example, carbon blacks (C.I. Pigment Black 7) such as furnace black, lamp black, acetylene black, and channel black and iron oxide pigments; and organic pigments, for example, aniline black (C.I. Pigment Black 1). Among them, carbon black is preferred in the present invention. Carbon blacks include #2650, #2600, #2300, #2200, #1000, #980, #970, #966, #960, #950, #900, #850, MCF-88, #55, #52, #47, #45, #45L, #44, #33, #32, and #30 (the above products being manufactured by Mitsubishi Chemical Corporation), SpecalBlaek 4A, SpecialBlaeck 550, Printex 95, Printex 90, Printex 85, Printex 80, Printex 75, Printex 45, and Printex 40 (the above products being manufactured by Degussa Japan Co., Ltd.), Regal 660, Rmogul L, Monarch 1400, Monarch 1300, Monarch 1100, Monarch 800, and Monarch 900 (the above products being manufactured by Cabot Corporation, Cabot Japan K.K.), and Raven 7000, Raven 5750, Raven 5250, Raven 3500, Raven 2500 ULTRA, Raven 2000, Raven 1500, Raven 1255, Raven 1200, Raven 1190 ULTRA, Raven 1170, Raven 1100 ULTRA, Raven 5000 UIII (the above products being manufactured by Columbian).

The concentration of the pigment may be regulated to a proper pigment concentration (content) in preparing an ink composition and thus is not particularly limited. In general, however, the pigment concentration is 5 to 20% by weight.

The pigment is preferably a pigment which has been kneaded with a dispersing agent which will be described later, from the viewpoints of simultaneously realizing gloss and bronzing prevention of images, and storage stability of ink composition and, at the same time, forming color images having better gloss.

<Dispersant>

The ink composition according to the present invention preferably comprises at least one resin selected from styrene-acrylic acid copolymer resins, urethane resins, and fluorene resins, as a dispersing agent for dispersing a colorant. These copolymer resins are adsorbed to a pigment to improve the dispersibility of the pigment.

Specific examples of hydrophobic monomers in the copolymer resin include methyl acrylate, methyl methacrylate, ethyl acrylate, ethyl methacrylate, n-propyl acrylate, n-propyl methacrylate, iso-propyl acrylate, iso-propyl methacrylate, n-butyl acrylate, n-butyl methacrylate, sec-butyl acrylate, sec-butyl methacrylate, tert-butyl acrylate, tert-butyl methacrylate, n-hexyl acrylate, n-hexyl methacrylate, n-octyl acrylate, n-octyl methacrylate, iso-octyl acrylate, iso-octyl methacrylate, 2-ethylhexyl acrylate, 2-ethylhexyl methacrylate, decyl acrylate, decyl methacrylate, lauryl acrylate, lauryl methacrylate, stearyl acrylate, stearyl methacrylate, 2-hydroxyethyl acrylate, 2-hydroxyethyl methacrylate, 2-hydroxypropyl acrylate, 2-hydroxypropyl methacrylate, 2-dimethylaminoethyl acrylate, 2-dimethylaminoethyl methacrylate, 2-diethylaminoethyl acrylate, 2-diethylaminoethyl methacrylate, glycidyl acrylate, glycidyl methacrylate, allyl acrylate, allyl methacrylate, cyclohexyl acrylate, cyclohexyl methacrylate, phenyl acrylate, phenyl methacrylate, nonylphenyl acrylate, nonylphenyl methacrylate, benzyl acrylate, benzyl methacrylate, dicyclopentenyl acrylate, dicyclopentenyl methacrylate, bornyl acrylate, bornyl methacrylate, 1,3-butanediol diacrylate, 1,3-butanediol dimethacrylate, 1,4-butanediol diacrylate, 1,4-butanediol dimethacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentyl glycol diacrylate, 1,6-hexanediol diacrylate, 1,6-hexanediol dimethacrylate, dipropylene glycol diacrylate, dipropylene glycol dimethacrylate, trimethylolpropane triacrylate, trimethylolpropane trimethacrylate, glycerol acrylate, glycerol methacrylate, styrene, methylstyrene, and vinyltoluene. They may be used either solely or as a mixture of two or more.

Specific examples of hydrophilic monomers include acrylic acid, methacrylic acid, maleic acid, and itaconic acid.

The copolymer resin of a hydrophobic monomer and a hydrophilic monomer is preferably at least any one of styrene-(meth) acrylic acid copolymer resins, styrene-methylstyrene-(meth)acrylic acid copolymer resins, styrene-maleic acid copolymer resins, (meth)acrylic acid-(meth)acrylic ester copolymer resins, and styrene-(meth)acrylic acid-(meth) acrylic ester copolymer resins, from the viewpoints of simultaneously satisfying color image gloss, bronzing prevention, and ink composition storage stability requirements and, at the same time, forming color images having better gloss.

The copolymer resin may be a resin (styrene-acrylic acid resin) comprising a polymer produced by reacting styrene with acrylic acid or an acrylic ester. Alternatively, the copolymer resin may be an acrylic acid-type water-soluble resin. Alternatively, salts thereof, for example, sodium, potassium, or ammonium salts thereof, may also be used.

The content of the copolymer resin is preferably 10 to 50 parts by weight, more preferably 10 to 35 parts by weight, based on 100 parts by weight of the pigment, from the viewpoints of simultaneously satisfying color image gloss, bronzing prevention, and ink composition storage stability requirements and, at the same time, forming color images having better gloss.

In the present invention, the use of urethane resin as a dispersing agent for a pigment can simultaneously realize gloss and bronzing prevention of color images, and the storage stability of the ink composition and, at the same time, can realize the formation of color images having better gloss. The urethane resin is a resin containing a polymer produced by reacting a diisocyanate compound with a diol compound. In the present invention, a resin containing a urethane bond and/or an amide bond and an acidic group is preferred.

Diisocyanate compounds include, for example, araliphatic diisocyanate compounds such as hexamethylene diisocyanate and 2,2,4-trimethylhexamethylene diisocyanate, and aromatic diisocyanate compounds such as toluoylene diisocyanate and phenylmethane diisocyanate, and modification products thereof.

Diol compounds, include, for example, polyether-type diol compounds such as polyethylene glycol and polypropylene glycol, polyester-type diol compounds such as polyethylene adipate and polybutylene adipate, and polycarbonate-type diol compounds.

The urethane resin preferably contains a carboxyl group.

Further, In the present invention, the pigment dispersing agent may be a fluorene resin.

The weight ratio of the copolymer resin to the urethane resin (former/latter) is preferably 1/2 to 2/1. The weight ratio of the copolymer resin to the urethane resin is more preferably 1/1.5 to 1.5/1 from the viewpoints of simultaneously realizing the gloss and bronzing prevention of color images and the storage stability of ink composition and, at the same time, forming color images having better gloss.

The weight ratio of the solid content of the pigment to the solid content other than the pigment (former/latter) is preferably 100/20 to 100/80 from the viewpoints of simultaneously realizing the gloss and bronzing prevention of color images and the storage stability of ink composition and, at the same time, forming color images having better gloss.

The content of the copolymer resin is preferably 10 to 50 parts by weight, more preferably 10 to 35 parts by weight, based on 100 parts by weight of the pigment, from the viewpoints of simultaneously realizing the gloss and bronzing prevention of color images and the storage stability of ink composition and, at the same time, forming color images having better gloss.

The content of the urethane resin is preferably 10 to 40 parts by weight, more preferably 10 to 35 parts by weight, based on 100 parts by weight of the pigment, from the viewpoints of simultaneously realizing the gloss and bronzing prevention of color images and the storage stability of ink composition and, at the same time, forming color images having better gloss.

The content of the fluorene resin is preferably 20 to 200 parts by weight, more preferably 10 to 80 parts by weight, based on 100 parts by weight of the pigment, from the viewpoints of simultaneously realizing the gloss and bronzing prevention of color images and the storage stability of ink composition and, at the same time, forming color images having better gloss.

The total amount of the copolymer resin and the urethane resin is preferably not more than 90 parts by weight (more preferably not more than 70 parts by weight) based on 100 parts by weight of the pigment from the viewpoints of simultaneously realizing gloss and bronzing prevention of color images and the storage stability of ink composition and, at the same time, forming color images having better gloss.

The acid value of the copolymer resin is preferably 50 to 320, more preferably 100 to 250, from the viewpoints of simultaneously realizing the gloss and bronzing prevention of color images and the storage stability of ink composition and, at the same time, forming color images having better gloss.

The acid value of the urethane resin is preferably 10 to 300, more preferably 20 to 100, from the viewpoints of simultaneously realizing the gloss and bronzing prevention of color images and the storage stability of ink composition and, at the same time, forming color images having better gloss. The acid value is the amount (mg) of KOH necessary for neutralizing 1 g of resin.

The weight average molecular weight (Mw) of the copolymer resin is preferably 2,000 to 30,000, more preferably 2,000 to 20,000, from the viewpoints of simultaneously realizing the gloss and bronzing prevention of color images and the storage stability of ink composition and, at the same time, forming color images having better gloss.

The weight average molecular weight (Mw) of the urethane resin before cross-link is preferably 100 to 200,000, more preferably 1,000 to 50,000, from the viewpoints of simultaneously realizing the gloss and bronzing prevention of color images and the storage stability of ink composition and, at the same time, forming color images having better gloss. Mw may be determined, for example, by GPC (gel permeation chromatography).

The glass transition temperature (Tg; as measured according to JIS K 6900) of the copolymer resin is preferably 30° C. or above, more preferably 50 to 130° C., from the viewpoints of simultaneously realizing the gloss and bronzing prevention of color images and the storage stability of ink composition and, at the same time, forming color images having better gloss.

The glass transition temperature (Tg; as measured according to JIS K 6900) of the urethane resin is preferably −50 to 200° C., more preferably −50 to 100° C., from the viewpoints of simultaneously realizing the gloss and bronzing prevention of color images and the storage stability of ink composition and, at the same time, forming color images having better gloss.

The copolymer resin is in some cases adsorbed to the pigment in the pigment dispersion liquid in this embodiment A and is in some cases in a free form. From the viewpoints of simultaneously realizing the gloss and bronzing prevention of color images and the storage stability of ink composition and, at the same time, forming color images having better gloss, the copolymer resin preferably has a maximum particle diameter of not more than 0.3 μm and more preferably has an average particle diameter of not more than 0.2 μm (still more preferably not more than 0.1 μm). The average particle diameter is an average value of dispersion diameters (cumulative 50% diameter) as particles which the pigment actually form in the dispersion liquid, and may be measured, for example, with Microtrack UPA (manufactured by Microtrac Inc.).

A surfactant may be used as the dispersing agent. Such surfactants include anionic surfactants such as fatty acid salts, higher alkyldicarboxylic acid salts, higher alcohol sulfuric ester salts, higher alkylsulfonic acid salts, condensates of higher fatty acids with amino acids, sulfosuccinic ester salts, naphthenic acid salts, liquid fatty oil sulfuric ester salts, and alkylailylsulfonic acid salts; cationic surfactants such as fatty acid amine salts, quaternary ammonium salts, sulfonium salts, and phosphoniums; and nonionic surfactants such as polyoxyethylene alkyl ethers, polyoxyethylene alkyl esters, sorbitan alkyl esters, and polyoxyethylene sorbitan alkyl esters. It is needless to say that the above surfactants, when added to the ink composition, can function also as a surfactant. In this case, however, the surfactant should be added so that the contact angle of the recording medium with the ink composition falls within the above defined range.

<Surfactant>

The ink composition for ink jet recording according to the present invention contains a surfactant as an indispensable ingredient. When the recording medium used has on its surface a resin coating receptive to ink, the use of a surfactant in the ink composition for ink jet recording can realize images having excellent gloss even on recording media, in which greater importance is attached to a glossy impression, for example, photographic paper. Even when a recording medium comprising a surface receptive layer provided with a coating layer for receiving an oil-based ink, for example, printing paper for running-on, is used, color-to-color bleeding can be prevented and, at the same time, reflected light-derived whitening caused by increasing the deposition amount of the ink can be prevented.

In the present invention, preferably, the surfactant has a dynamic surface tension at 1 Hz of not more than 26 mN/m in the form of an aqueous solution comprising 20% by weight of glycerin, 10% by weight of 1,2-hexanediol, 0.1% by weight of the surfactant, and 69.9% by weight of water. When the surfactant has the above property, in forming a recorded image, the capability of the ink to wet the surface of the recording medium can be enhanced to enhance the penetration of the ink. The surface tension of the aqueous solution may be measured on a platinum plate, for example, with an automatic dynamic surface tensiometer CBVP-Z (manufactured by Kyowa Interface Science Co., Ltd.). However, the method for measuring the surface tension is not limited to this only.

In the present invention, organopolysiloxane surfactants are suitable as the surfactant for realizing the above surface tension. The use of the organopolysiloxane surfactant is advantageous in that, since the above specific two alkanediols are contained, the solubility of the surfactant in the ink is improved to suppress the occurrence of insolubles and the like, whereby an ink composition having better ejection stability can be realized.

Such surfactants may be commercially available products, and examples thereof include KF-353A, KF6017, X-22-6551 and AW-3 (all the above products being manufactured by The Shin-Etsu Chemical Co., Ltd.).

More preferably, the ink composition contains one or at least two compounds represented by formula (I) as the organopolysiloxane surfactant:

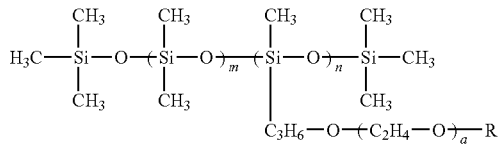

wherein R represents a hydrogen atom or a methyl group; a is an integer of 2 to 11; m is an integer of 2 to 50; and n is an integer of 1 to 5. When such specific organopolysiloxane surfactants are used, uneven coagulation of the ink can be further reduced even when printing paper for running-on is used as the recording medium.

In the compound of formula (I), more preferred are compounds in which a is an integer of 2 to 5, m is an integer of 20 to 40, and n is an integer of 2 to 4, compounds in which a is an integer of 7 to 11, m is an integer of 30 to 50, and n is an integer of 3 to 5, or compounds in which a is an integer of 2 to 4, m is an integer of 2 to 4, and n is an integer of 1 to 2. The use of such compounds can further reduce uneven coagulation of ink.

The content of the surfactant in the ink composition according to the present invention is preferably 0.01 to 2.00% by weight, more preferably 0.05 to 0.50% by weight. In particular, when the surfactant wherein R represents a methyl group is used, preferably, the content of the surfactant is larger than the case where the surfactant wherein R represents H is used.

Other surfactants, specifically acetylene glycol surfactants, anionic surfactants, nonionic surfactants, amphoteric surfactants and the like, may be further added to the ink composition according to the present invention.

Examples of acetylene glycol surfactants among these other surfactants include 2,4,7,9-tetramethyl-5-decyne-4,7-diol, 3,6-dimethyl-4-octyne-3,6-diol, 3,5-dimethyl-1-hexyn-3-ol, or 2,4-dimethyl-5-hexyn-3-ol. Acetylene glycol surfactants may also be commercially available products. Examples thereof include Olfine E1010, Olfine STG, or Olfine Y (tradename, manufactured by Nissin Chemical Industry Co., Ltd.) and Surfynol 61, Surfynol 104, Surfynol 82, Surfynol 465, Surfynol 485 or Surfynol TG (tradename, manufactured by Air Products and Chemicals Inc.).

<Organic Amine>

The ink composition for ink jet recording according to the present invention may further comprises an organic amine and/or an inorganic amine. The organic amine and/or inorganic amine can enhance the capability of the ink to wet the recording face, for example, in recording media in forming a recorded image to enhance the penetration of the ink. Further, the organic amine and/or inorganic amine can realize easy adjustment of the pH value of the ink composition to a suitable pH value range. The term "organic amine" and "inorganic amine" as used herein refer to amines used in conventional inks for ink jet recording. Further, the expression "substantially free from" means that the content in the ink composition is less than 0.3% by weight.

The organic amine is preferably a tertiary amine. The inorganic amine is preferably a monovalent metal salt such as potassium hydroxide or sodium hydroxide.

For example, alkanolamines such as triethanolamine may be mentioned as the tertiary amine. The pH value of the ink composition according to the present invention is preferably 8 to 12, particularly preferably 8 to 10. When the pH value is in the above-defined range, a deterioration in members in contact with the ink can be prevented.

The content of the organic amine in the total weight of the ink composition is not less than 0.1% by weight. In this case, the capability of the ink composition to wet a recording face, for example, in a recording medium in recorded image formation can be enhanced to enhance ink penetration. From the viewpoints of the ejection stability and storage stability of the ink, the content of the organic amine is preferably 0.1 to 2.0% by weight, more preferably 0.3 to 1.0% by weight.

<Water and Other Ingredients>

The ink composition for ink jet recording according to the present invention comprises the above specific solvent and surfactant, other various additives and further contains water as a solvent. Water is preferably pure water obtained by ion exchange, ultrafiltration, reverse osmosis, distillation or the like, or ultrapure water. These waters, which have been sterilized, for example, by ultraviolet irradiation or by addition of hydrogen peroxide, are particularly preferred because they can prevent the growth of mold or bacteria in the ink composition for a long period of time.

Further, the ink composition according to the present invention preferably comprises a penetrating agent in addition to the above ingredients.

Glycol ethers are suitable as the penetrating agent.

Specific examples of glycol ethers usable herein include ethylene glycol monomethyl ether, ethylene glycol monoethyl ether, ethylene glycol mono-iso-propyl ether, ethylene glycol mono-n-butyl ether, ethylene glycol mono-iso-butyl ether, ethylene glycol mono-tert-butyl ether, ethylene glycol monomethyl ether acetate, diethylene glycol monomethyl ether, diethylene glycol monoethyl ether, diethylene glycol mono-n-propyl ether, diethylene glycol mono-Iso-propyl ether, diethylene glycol mono-n-butyl ether, diethylene glycol mono-tert-butyl ether, triethylene glycol mono-n-butyl ether, propylene glycol monomethyl ether, propylene glycol monoethyl ether, propylene glycol mono-n-propyl ether, propylene glycol mono-iso-propyl ether, propylene glycol mono-n-butyl ether, propylene glycol mono-tert-butyl ether, dipropylene glycol monomethyl ether, dipropylene glycol monoethyl ether, dipropylene glycol mono-n-propyl ether, dipropylene glycol-Iso-propyl ether, dipropylene glycol mono-n-butyl ether, dipropylene glycol mono-tert-butyl ether, and 1-methyl-1-methoxybutanol. They may be used either solely or as a mixture of two or more.

Among the above glycol ethers, alkyl ethers of polyhydric alcohols are preferred. Particularly preferred are ethylene glycol monoethyl ether, ethylene glycol mono-n-butyl ether, diethylene glycol monomethyl ether, diethylene glycol monoethyl ether, diethylene glycol mono-n-butyl ether, triethylene glycol monomethyl ether, triethylene glycol monoethyl ether, or triethylene glycol mono-n-butyl ether. More preferred are triethylene glycol mono-n-butyl ether.

The addition amount of the penetrating agent may be properly determined but is preferably about 0.1 to 30% by weight, more preferably about 1 to 20% by weight.

Preferably, the ink composition according to the present invention further comprises a solubilizer for a recording medium in addition to the above ingredients.

Pyrrolidones such as N-methyl-2-pyrrolidone are suitable as a solubilizer for a recording medium. The addition amount of the solubilizer for a recording medium may be properly determined but is preferably about 0.1 to 30% by weight, more preferably about 1 to 20% by weight.

Preferably, the ink composition for ink jet recording according to the present invention is substantially free from a wetting agent. The wetting agent functions to prevent ink from drying and solidifying, for example, in ink jet nozzles.

Accordingly, when ink is dropped on a synthetic paper having a low level of ink absorption, in some cases, due to the presence of the wetting agent, the ink is not dried and a problem is disadvantageously posed in high speed printing. Further, when a wetting agent-containing ink is used, in such a state that ink not yet absorbed in the recording medium is present on the surface of the recording medium, a next ink is deposited on the recording medium, often resulting in the occurrence of coagulation spots. Accordingly, in the present invention, when recording media having a low level of ink absorption are used, preferably, the ink composition is substantially free from the wetting agent. Even when the ink is disadvantageously dried and solidified in ink jet nozzles, the solidified ink can be redissolved by applying a wetting agent-containing solution. In the present invention, preferably, the ink composition is substantially free from a wetting agent which is liquid at 20° C.

The term "wetting agent" as used herein refers to wetting agents used in conventional inks for ink jet recording, and specific examples thereof include glycerin, ethylene glycol, diethylene glycol, triethylene glycol, trimethylolpropane, trimethylolmethane, and trimethylolethane. The expression "substantially free from" means that the addition amount of the wetting agent is less than 1% by weight based on the ink composition. It is known to a person having ordinary skill in the art that a part of the above-described penetration solvents function also as a wetting agent. In the present specification, however, the penetration solvent is not regarded as the wetting agent.

If necessary, other additives, for example, nozzle clogging preventives, preservatives, antioxidants, electric conductivity adjustors, pH adjustors, viscosity modifiers, surface tension modifiers, and oxygen absorbers, may be further added to the ink composition according to the present invention.

For example, sodium benzoate, pentachlorophenol sodium, 2-pyridinethiol-1-oxide sodium, sodium sorbate, sodium dehydroacetate, and 1,2-dibenzothiazolin-3-one (Proxel CRL, Proxel BND, Proxel GXL, Proxel XL-2, and Proxel TN, manufactured by ICI) may be used as preservatives and antimolds.

Examples of pH adjustors, dissolution aids, or antioxidants usable herein include: amines such as diethanolamine, triethanolamine, propanolamine, and morpholine, and modification products thereof; inorganic salts such as potassium hydroxide, sodium hydroxide, and lithium hydroxide; ammonium hydroxide; quaternary ammonium hydroxides such as tetramethylammonium; salts of carbonic acid such as potassium carbonate, sodium carbonate, and lithium carbonate; salts of phosphoric acid, such as potassium phosphate, sodium phosphate, and lithium phosphate; N-methyl-2-pyrrolidone; urea compounds such as urea, thiourea, and tetramethylurea; allophanates such as allophanate and methyl allophanate; biurets such as biuret, dimethylbiuret, and tetramethylbiuret; and L-ascorbic acid and salts thereof.

The ink composition according to the present invention may contain an additional antioxidant and an ultraviolet absorber, and examples thereof include: products of Ciba Specialty Chemicals, K.K., for example, Tinuvin 328, Tinuvin 900, Tinuvin 1130, Tinuvin 384, Tinuvin 123, Tinuvin 144, Tinuvin 622, Tinuvin 770 and Tinuvin 292; Irgacor 252 and Irgacor 153; Irganox 1010, Irganox 1076, and Irganox 1035; MD 1024; and lanthanide oxides.

The ink composition according to the present invention can be produced by dispersing and mixing the above ingredients by a suitable method. Preferably, an ink solution is prepared by first mixing the pigment, the polymeric dispersant, and water together by a suitable dispergator, for example, a ball mill, a sand mill, an attritor, a roll mill, an agitator mill, a Henschel mixer, a colloid mill, an ultrasonic homogenizer, a jet mill, or an angmill to prepare a homogeneous pigment dispersion liquid, then adding, for example, separately prepared resins (resin emulsion), water, water-soluble organic solvents, saccharides, pH adjustors, preservatives and antimolds, and satisfactorily dissolving the components. After the satisfactory stirring, the mixture is filtered for the removal of coarse particles and foreign matter causative of clogging to prepare a contemplated ink composition.

Method for Ink Jet Recording

The method for ink jet recording according to the present invention comprises ejecting droplets of the ink composition and depositing the droplets onto a recording medium to perform printing. In this method, the ejected ink droplets are deposited onto the recording medium so that dots are superimposed on top of each other. In the recording method according to the present invention, preferably, synthetic paper and printing paper for running-on are used as the recording medium. Even when the specific recording medium is used, images possessing excellent glossiness and good color reproduction can be realized. Synthetic papers include those produced by using a synthetic resin such as polypropylene, polyethylene, or polyester as a main material.

Further, in the present invention, when the recording medium has an ink receptive layer on its surface, preferably, the ink receptive layer comprises polyisocyanate and/or polyamine. When the above ink composition is deposited on the receptive layer containing polyisocyanate and/or polyamine, a reaction of the polyisocyanate with the hydroxyl group in the ink or a reaction of the polyamine with triethanolamine in the ink takes place to form a resin, whereby highly waterfast images can be realized. Block isocyanate is suitable as the polyisocyanate, and specific examples thereof include WB 700, WB 720, WB 800, WB 820, WB 900, WB 920, and the like manufactured by Mitsui Chemicals Polyurethanes Inc. Among them, WB 720 is preferred from the viewpoint of drying properties.

Further, in the recording method according to the present invention, when a recording medium having a low level of ink absorption is used, a method is preferably adopted in which, after the formation of an image on the recording medium, water contained in the ink composition is removed to a certain extend by drying means such as air drying to reduce the fluidity of a colorant in the ink composition followed by steam washing of the recording medium. The reason for this is that, after drying of the recording medium to such an extent that does not cause feathering or bleeding upon steam washing, a polyhydric alcohol compound or amine compound contained in the ink composition, and polyisocyanate or polyamine in the ink receptive layer in the recording medium are reacted with each other for curing by heat of steam and steam washing can remove the liquid component contained in the ink composition which stays on the image. Since the liquid component contained in the ink composition which stays on the image can be solidified or removed by the washing step, the printed matter can be used immediately after the printing.

Further, in the method for ink jet recording according to the present invention, preferably, droplets of the ink composition are ejected so that dots are arranged alternately in a direction perpendicular to the scanning direction of a recording head. When dots are formed in a checkered pattern in this way, the use of the ink composition according to the present invention can significantly reduce uneven coagulation as compared with the conventional ink composition.

EXAMPLES

The following Examples further illustrate the present invention. However, it should be noted that the present invention is not limited to these Examples.

<Preparation of Ink Compositions>

Ingredients were mixed together according to the formulations shown in Table 1, and the mixtures were filtered through a 10-μm membrane filter to prepare inks. In the table, the styrene-acrylic acid resin is a copolymer having a molecular weight of 1600 and an acid value of 150.

TABLE 1

| Composition | | Example 1 Ink set 1 | | | | Example 2 Ink set 2 | | | | Example 3 Ink set 3 | | | | Example 4 Ink set 4 | | | | Example 5 Ink set 5 | | | |
|---|---|---|---|---|---|---|---|---|---|---|---|---|---|---|---|---|---|---|---|---|---|
| | | 1Y | 1M | 1C | 1B | 2Y | 2M | 2C | 2B | 3Y | 3M | 3C | 3B | 4Y | 4M | 4C | 4B | 5Y | 5M | 5C | 5B |
| Colorant | C.I. Pigment Yellow 74 | 6.0 | — | — | — | 6.0 | — | — | — | 6.0 | — | — | — | 6.0 | — | — | — | 6.0 | — | — | — |
| | C.I. Pigment Red 122 | — | 6.0 | — | — | — | 6.0 | — | — | — | 6.0 | — | — | — | 6.0 | — | — | — | 6.0 | — | — |
| | C.I. Pigment Blue 15:4 | — | — | 6.0 | — | — | — | 6.0 | — | — | — | 6.0 | — | — | — | 6.0 | — | — | — | 6.0 | — |
| | C.I. Pigment Black 6 | — | — | — | 6.0 | — | — | — | 6.0 | — | — | — | 6.0 | — | — | — | 6.0 | — | — | — | 6.0 |
| | Styrene-acrylic resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| Alkane-diol | 4-Methyl-1,2-pentanediol | 4 | 4 | 4 | 4 | 3 | 3 | 3 | 3 | 3 | 3 | 3 | 3 | 3 | 3 | 3 | 3 | 2 | 2 | 2 | 2 |
| | 1,2-Octanediol | 2 | 2 | 2 | 2 | 1.5 | 1.5 | 1.5 | 1.5 | 1 | 1 | 1 | 1 | 2 | 2 | 2 | 2 | 1 | 1 | 1 | 1 |
| | 2-Butyl-2-methyl-1,3-propanediol | 2 | 2 | 2 | 2 | 1.5 | 1.5 | 1.5 | 1.5 | 2 | 2 | 2 | 2 | 1 | 1 | 1 | 1 | 2 | 2 | 2 | 2 |
| Surfactant | NONI 131 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Trimethylolpropane | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 |
| | Triethanolamine | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 |
| | Pure water | Balance | Balance | Balance | Balance | Balance | Balance | Balance | Balance | Balance | Balance | Balance | Balance | Balance | Balance | Balance | Balance | Balance | Balance | Balance | Balance |
| | | 100 | 100 | 100 | 100 | 100 | 100 | 100 | 100 | 100 | 100 | 100 | 100 | 100 | 100 | 100 | 100 | 100 | 100 | 100 | 100 |

| Composition | | Example 6 Ink set 6 | | | | Example 7 Ink set 7 | | | | Example 8 Ink set 8 | | | | Example 9 Ink set 9 | | | | Example 10 Ink set 10 | | | |
|---|---|---|---|---|---|---|---|---|---|---|---|---|---|---|---|---|---|---|---|---|---|
| | | 1Y | 1M | 1C | 1B | 2Y | 2M | 2C | 2B | 3Y | 3M | 3C | 3B | 4Y | 4M | 4C | 4B | 5Y | 5M | 5C | 5B |
| Colorant | C.I. Pigment Yellow 74 | 6.0 | — | — | — | 6.0 | — | — | — | 6.0 | — | — | — | 6.0 | — | — | — | 6.0 | — | — | — |
| | C.I. Pigment Red 122 | — | 6.0 | — | — | — | 6.0 | — | — | — | 6.0 | — | — | — | 6.0 | — | — | — | 6.0 | — | — |
| | C.I. Pigment Blue 15:4 | — | — | 6.0 | — | — | — | 6.0 | — | — | — | 6.0 | — | — | — | 6.0 | — | — | — | 6.0 | — |
| | C.I. Pigment Black 6 | — | — | — | 6.0 | — | — | — | 6.0 | — | — | — | 6.0 | — | — | — | 6.0 | — | — | — | 6.0 |
| | Styrene-acrylic resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| Alkane-diol | 4-Methyl-1,2-pentanediol | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 |
| | | 2 | 2 | 2 | 2 | 2 | 2 | 2 | 2 | 2 | 2 | 2 | 2 | 4 | 4 | 4 | 4 | 3 | 3 | 3 | 3 |

TABLE 1-continued

| Composition | Example 11 Ink set 11 | | | | Example 12 Ink set 12 | | | | Example 13 Ink set 13 | | | | Example 14 Ink set 14 | | | | Example 15 Ink set 15 | | | |
|---|---|---|---|---|---|---|---|---|---|---|---|---|---|---|---|---|---|---|---|---|
| | 1Y | 1M | 1C | 1B | 2Y | 2M | 2C | 2B | 3Y | 3M | 3C | 3B | 4Y | 4M | 4C | 4B | 5Y | 5M | 5C | 5B |
| 1,2-Octanediol | 2 | 2 | 2 | 2 | 1 | 1 | 1 | 1 | 0.5 | 0.5 | 0.5 | 0.5 | 2 | 2 | 2 | 2 | 1.5 | 1.5 | 1.5 | 1.5 |
| 2-Butyl-2-methyl-1,3-propanediol | 1 | 1 | 1 | 1 | 1 | 1 | 1 | 1 | 0.5 | 0.5 | 0.5 | 0.5 | 2 | 2 | 2 | 2 | 1.5 | 1.5 | 1.5 | 1.5 |
| Surfactant NONI 131 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Trimethylolpropane | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 |
| Triethanolamine | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 |
| Pure water | Balance | Balance | Balance | Balance | Balance | Balance | Balance | Balance | Balance | Balance | Balance | Balance | Balance | Balance | Balance | Balance | Balance | Balance | Balance | Balance |
| Balance | 100 | 100 | 100 | 100 | 100 | 100 | 100 | 100 | 100 | 100 | 100 | 100 | 100 | 100 | 100 | 100 | 100 | 100 | 100 | 100 |

| Composition | Example 16 Ink set 16 | | | | Example 17 Ink set 17 | | | | Example 18 Ink set 18 | | | | Example 19 Ink set 19 | | | | Example 20 Ink set 20 | | | |
|---|---|---|---|---|---|---|---|---|---|---|---|---|---|---|---|---|---|---|---|---|
| | 1Y | 1M | 1C | 1B | 2Y | 2M | 2C | 2B | 3Y | 3M | 3C | 3B | 4Y | 4M | 4C | 4B | 5Y | 5M | 5C | 5B |
| Colorant C.I. Pigment Yellow 74 | 6.0 | — | — | — | 6.0 | — | — | — | 6.0 | — | — | — | 6.0 | — | — | — | 6.0 | — | — | — |
| C.I. Pigment Red 122 | — | 6.0 | — | — | — | 6.0 | — | — | — | 6.0 | — | — | — | 6.0 | — | — | — | 6.0 | — | — |
| C.I. Pigment Blue 15:4 | — | — | 6.0 | — | — | — | 6.0 | — | — | — | 6.0 | — | — | — | 6.0 | — | — | — | 6.0 | — |
| C.I. Pigment Black 6 | — | — | — | 6.0 | — | — | — | 6.0 | — | — | — | 6.0 | — | — | — | 6.0 | — | — | — | 6.0 |
| Styrene-acrylic resin | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 |
| Alkanediol 4-Methyl-1,2-pentanediol | 3 | 3 | 3 | 3 | 3 | 3 | 3 | 3 | 2 | 2 | 2 | 2 | 2 | 2 | 2 | 2 | 2 | 2 | 2 | 2 |
| 1,2-Octanediol | 1 | 1 | 1 | 1 | 1 | 1 | 1 | 1 | 1 | 1 | 1 | 1 | 2 | 2 | 2 | 2 | 1 | 1 | 1 | 1 |
| 2-Butyl-2-methyl-1,3-propanediol | 2 | 2 | 2 | 2 | 1 | 1 | 1 | 1 | 2 | 2 | 2 | 2 | 1 | 1 | 1 | 1 | 1 | 1 | 1 | 1 |
| Surfactant NONI 131 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Trimethylolpropane | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 |
| Triethanolamine | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 |
| Pure water | Balance | Balance | Balance | Balance | Balance | Balance | Balance | Balance | Balance | Balance | Balance | Balance | Balance | Balance | Balance | Balance | Balance | Balance | Balance | Balance |
| Balance | 100 | 100 | 100 | 100 | 100 | 100 | 100 | 100 | 100 | 100 | 100 | 100 | 100 | 100 | 100 | 100 | 100 | 100 | 100 | 100 |

| Composition | 1Y | 1M | 1C | 1B | 2Y | 2M | 2C | 2B | 3Y | 3M | 3C | 3B | 4Y | 4M | 4C | 4B | 5Y | 5M | 5C | 5B |
|---|---|---|---|---|---|---|---|---|---|---|---|---|---|---|---|---|---|---|---|---|
| Colorant C.I. Pigment Yellow 74 | 6.0 | — | — | — | 6.0 | — | — | — | 6.0 | — | — | — | 6.0 | — | — | — | 6.0 | — | — | — |

TABLE 1-continued

Example 21 / Ink set 21 and Example 22 / Ink set 22:

| Composition | | 1Y | 1M | 1C | 1B | 2Y | 2M | 2C | 2B |
|---|---|---|---|---|---|---|---|---|---|
| Colorant | C.I. Pigment Yellow 74 | 6.0 | — | — | — | 6.0 | — | — | — |
| | C.I. Pigment Red 122 | — | 6.0 | — | — | — | 6.0 | — | — |
| | C.I. Pigment Blue 15:4 | — | — | 6.0 | — | — | — | 6.0 | — |
| | C.I. Pigment Black 6 | — | — | — | 6.0 | — | — | — | 6.0 |
| Styrene-acrylic resin | | 1.8 / 2 | 1.8 / 2 | 1.8 / 2 | 1.8 / 2 | 2.4 / 4 | 2.4 / 4 | 2.4 / 4 | 2.4 / 4 |
| Alkane-diol | 4-Methyl-1,2-pentanediol | 0.5 / 0.5 | 0.5 / 0.5 | 0.5 / 0.5 | 0.5 / 0.5 | — | — | — | — |
| | 1,2-Octanediol | | | | | | | | |
| | 2-Butyl-2-methyl-1,3-propanediol | 1 / 2 | 1 / 2 | 1 / 2 | 1 / 2 | 2 / 1 | 2 / 1 | 2 / 1 | 2 / 1 |
| Surfactant | NONI 131 | 0.1 | 0.1 | 0.1 | 0.1 | 0.1 | 0.1 | 0.1 | 0.1 |
| Trimethylolpropane | | 8.0 | 8.0 | 8.0 | 8.0 | 8.0 | 8.0 | 8.0 | 8.0 |
| Triethanolamine | | — | — | — | — | — | — | — | — |
| Pure water | | Balance | Balance | Balance | Balance | Balance | Balance | Balance | Balance |
| | Balance | 100 | 100 | 100 | 100 | 100 | 100 | 100 | 100 |

Example 23 / Ink set 23, Example 24 / Ink set 24, and Example 25 / Ink set 25:

| Composition | | 3Y | 3M | 3C | 3B | 4Y | 4M | 4C | 4B | 5Y | 5M | 5C | 5B |
|---|---|---|---|---|---|---|---|---|---|---|---|---|---|
| Colorant | C.I. Pigment Yellow 74 | 6.0 | — | — | — | 6.0 | — | — | — | 6.0 | — | — | — |
| | C.I. Pigment Red 122 | — | 6.0 | — | — | — | 6.0 | — | — | — | 6.0 | — | — |
| | C.I. Pigment Blue 15:4 | — | — | 6.0 | — | — | — | 6.0 | — | — | — | 6.0 | — |
| | C.I. Pigment Black 6 | — | — | — | 6.0 | — | — | — | 6.0 | — | — | — | 6.0 |
| Styrene-acrylic resin | | 2.4 / 2 | 2.4 / 2 | 2.4 / 2 | 2.4 / 2 | 2.4 / 2 | 2.4 / 2 | 2.4 / 2 | 2.4 / 2 | 1.8 / 4 | 1.8 / 4 | 1.8 / 4 | 1.8 / 4 |
| Alkane-diol | 4-Methyl-1,2-pentanediol | 1.5 / 1.5 | 1.5 / 1.5 | 1.5 / 1.5 | 1.5 / 1.5 | 0.5 / 0.5 | 0.5 / 0.5 | 0.5 / 0.5 | 0.5 / 0.5 | — | — | — | — |
| | 1,2-Octanediol | | | | | | | | | | | | |
| | 2-Butyl-2-methyl-1,3-propanediol | 1 / 1 | 1 / 1 | 1 / 1 | 1 / 1 | 1 / 2 | 1 / 2 | 1 / 2 | 1 / 2 | 2 / 2 | 2 / 2 | 2 / 2 | 2 / 2 |
| Surfactant | NONI 131 | 0.1 | 0.1 | 0.1 | 0.1 | 0.1 | 0.1 | 0.1 | 0.1 | 0.1 | 0.1 | 0.1 | 0.1 |
| Trimethylolpropane | | 8.0 | 8.0 | 8.0 | 8.0 | 8.0 | 8.0 | 8.0 | 8.0 | 8.0 | 8.0 | 8.0 | 8.0 |
| Triethanolamine | | — | — | — | — | — | — | — | — | — | — | — | — |
| Pure water | | Balance | Balance | Balance | Balance | Balance | Balance | Balance | Balance | Balance | Balance | Balance | Balance |
| | Balance | 100 | 100 | 100 | 100 | 100 | 100 | 100 | 100 | 100 | 100 | 100 | 100 |

TABLE 1-continued

| Composition | | 1Y | 1M | 1C | 1B | 2Y | 2M | 2C | 2B | 3Y | 3M | 3C | 3B | 4Y | 4M | 4C | 4B | 5Y | 5M | 5C | 5B |
|---|---|---|---|---|---|---|---|---|---|---|---|---|---|---|---|---|---|---|---|---|---|
| | | Example 26 Ink set 26 | | | | Example 27 Ink set 27 | | | | Example 28 Ink set 28 | | | | Example 29 Ink set 29 | | | | Example 30 Ink set 30 | | | |
| Colorant | C.I. Pigment Yellow 74 | 6.0 | — | — | — | 6.0 | — | — | — | 6.0 | — | — | — | 6.0 | — | — | — | 6.0 | — | — | — |
| | C.I. Pigment Red 122 | — | 6.0 | — | — | — | 6.0 | — | — | — | 6.0 | — | — | — | 6.0 | — | — | — | 6.0 | — | — |
| | C.I. Pigment Blue 15:4 | — | — | 6.0 | — | — | — | 6.0 | — | — | — | 6.0 | — | — | — | 6.0 | — | — | — | 6.0 | — |
| | C.I. Pigment Black 6 | — | — | — | 6.0 | — | — | — | 6.0 | — | — | — | 6.0 | — | — | — | 6.0 | — | — | — | 6.0 |
| | Styrene-acrylic resin | 1.8 3 | 1.8 3 | 1.8 3 | 1.8 3 | 1.8 3 | 1.8 3 | 1.8 3 | 1.8 3 | 1.8 3 | 1.8 3 | 1.8 3 | 1.8 3 | 1.8 2 | 1.8 2 | 1.8 2 | 1.8 2 | 1.8 2 | 1.8 2 | 1.8 2 | 1.8 2 |
| Alkanediol | 4-Methyl-1,2-pentanediol | 1.5 1.5 | 1.5 1.5 | 1.5 1.5 | 1.5 1.5 | 1 2 | 1 2 | 1 2 | 1 2 | 2 1 | 2 1 | 2 1 | 2 1 | 1 2 | 1 2 | 1 2 | 1 2 | 2 1 | 2 1 | 2 1 | 2 1 |
| | 1,2-Octanediol | | | | | | | | | | | | | | | | | | | | |
| | 2-Butyl-2-methyl-1,3-propanediol | | | | | | | | | | | | | | | | | | | | |
| Surfactant | NONI 131 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Trimethylolpropane | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 |
| | Triethanolamine | — | — | — | — | — | — | — | — | — | — | — | — | — | — | — | — | — | — | — | — |
| | Pure water | Balance | Balance | Balance | Balance | Balance | Balance | Balance | Balance | Balance | Balance | Balance | Balance | Balance | Balance | Balance | Balance | Balance | Balance | Balance | Balance |
| | Balance | 100 | 100 | 100 | 100 | 100 | 100 | 100 | 100 | 100 | 100 | 100 | 100 | 100 | 100 | 100 | 100 | 100 | 100 | 100 | 100 |

| Composition | | 1Y | 1M | 1C | 1B | 2Y | 2M | 2C | 2B | 3Y | 3M | 3C | 3B | 4Y | 4M | 4C | 4B | 5Y | 5M | 5C | 5B |
|---|---|---|---|---|---|---|---|---|---|---|---|---|---|---|---|---|---|---|---|---|---|
| | | Example 31 Ink set 31 | | | | Example 32 Ink set 32 | | | | Example 33 Ink set 33 | | | | Example 34 Ink set 34 | | | | Example 35 Ink set 35 | | | |
| Colorant | C.I. Pigment Yellow 74 | 6.0 | — | — | — | 6.0 | — | — | — | 6.0 | — | — | — | 6.0 | — | — | — | 6.0 | — | — | — |
| | C.I. Pigment Red 122 | — | 6.0 | — | — | — | 6.0 | — | — | — | 6.0 | — | — | — | 6.0 | — | — | — | 6.0 | — | — |
| | C.I. Pigment Blue 15:4 | — | — | 6.0 | — | — | — | 6.0 | — | — | — | 6.0 | — | — | — | 6.0 | — | — | — | 6.0 | — |
| | C.I. Pigment Black 6 | — | — | — | 6.0 | — | — | — | 6.0 | — | — | — | 6.0 | — | — | — | 6.0 | — | — | — | 6.0 |

TABLE 1-continued

| | | | | | | | | | | | | | | | | | | | | |
|---|---|---|---|---|---|---|---|---|---|---|---|---|---|---|---|---|---|---|---|---|
| Styrene-acrylic resin | 1.8 | 1.8 | 1.8 | 1.8 | 1.8 | 1.8 | 1.8 | 1.8 | 2.4 | 2.4 | 2.4 | 2.4 | 2.4 | 2.4 | 2.4 | 2.4 | 2.4 | 2.4 | 2.4 | 2.4 |
| | 2 | 2 | 2 | 2 | 2 | 2 | 2 | 2 | 4 | 4 | 4 | 4 | 3 | 3 | 3 | 3 | 3 | 3 | 3 | 3 |
| Alkanediol 4-Methyl-1,2-pentanediol | 1 | 1 | 1 | 1 | — | — | — | — | — | — | — | — | 1.5 | 1.5 | 1.5 | 1.5 | 1 | 1 | 1 | 1 |
| 1,2-Octanediol | 1 | 1 | 1 | 1 | 0.5 | 0.5 | 0.5 | 0.5 | 2 | 2 | 2 | 2 | 1.5 | 1.5 | 1.5 | 1.5 | 2 | 2 | 2 | 2 |
| 2-Butyl-2-methyl-1,3-propanediol | — | — | — | — | — | — | — | — | — | — | — | — | — | — | — | — | — | — | — | — |
| Surfactant NONI 131 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Trimethylolpropane | 8.0 | 8.0 | 8.0 | 8.0 | — | — | — | — | — | — | — | — | — | — | — | — | — | — | — | — |
| Triethanolamine | — | — | — | — | — | — | — | — | — | — | — | — | — | — | — | — | — | — | — | — |
| Pure water | Balance | Balance | Balance | Balance | Balance | Balance | Balance | Balance | Balance | Balance | Balance | Balance | Balance | Balance | Balance | Balance | Balance | Balance | Balance | Balance |
| | 100 | 100 | 100 | 100 | 100 | 100 | 100 | 100 | 100 | 100 | 100 | 100 | 100 | 100 | 100 | 100 | 100 | 100 | 100 | 100 |

| | Example 36 Ink set 36 | | | | Example 37 Ink set 37 | | | | Example 38 Ink set 38 | | | | Example 39 Ink set 39 | | | | Example 40 Ink set 40 | | | |
|---|---|---|---|---|---|---|---|---|---|---|---|---|---|---|---|---|---|---|---|---|
| Composition | 1Y | 1M | 1C | 1B | 2Y | 2M | 2C | 2B | 3Y | 3M | 3C | 3B | 4Y | 4M | 4C | 4B | 5Y | 5M | 5C | 5B |
| Colorant C.I. Pigment Yellow 74 | 6.0 | — | — | — | 6.0 | — | — | — | 6.0 | — | — | — | 6.0 | — | — | — | 6.0 | — | — | — |
| C.I. Pigment Red 122 | — | 6.0 | — | — | — | 6.0 | — | — | — | 6.0 | — | — | — | 6.0 | — | — | — | 6.0 | — | — |
| C.I. Pigment Blue 15:4 | — | — | 6.0 | — | — | — | 6.0 | — | — | — | 6.0 | — | — | — | 6.0 | — | — | — | 6.0 | — |
| C.I. Pigment Black 6 | — | — | — | 6.0 | — | — | — | 6.0 | — | — | — | 6.0 | — | — | — | 6.0 | — | — | — | 6.0 |
| Styrene-acrylic resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| | 3 | 3 | 3 | 3 | 2 | 2 | 2 | 2 | 2 | 2 | 2 | 2 | 2 | 2 | 2 | 2 | 2 | 2 | 2 | 2 |
| Alkanediol 4-Methyl-1,2-pentanediol | 2 | 2 | 2 | 2 | 1 | 1 | 1 | 1 | 2 | 2 | 2 | 2 | 1 | 1 | 1 | 1 | — | — | — | — |
| 1,2-Octanediol | 1 | 1 | 1 | 1 | 2 | 2 | 2 | 2 | 1 | 1 | 1 | 1 | 1 | 1 | 1 | 1 | 0.5 | 0.5 | 0.5 | 0.5 |
| 2-Butyl-2-methyl-1,3-propanediol | — | — | — | — | — | — | — | — | — | — | — | — | — | — | — | — | 0.5 | 0.5 | 0.5 | 0.5 |
| Surfactant NONI 131 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Trimethylolpropane | — | — | — | — | — | — | — | — | — | — | — | — | — | — | — | — | — | — | — | — |
| Triethanolamine | — | — | — | — | — | — | — | — | — | — | — | — | — | — | — | — | — | — | — | — |
| Pure water | Balance | Balance | Balance | Balance | Balance | Balance | Balance | Balance | Balance | Balance | Balance | Balance | Balance | Balance | Balance | Balance | Balance | Balance | Balance | Balance |
| | 100 | 100 | 100 | 100 | 100 | 100 | 100 | 100 | 100 | 100 | 100 | 100 | 100 | 100 | 100 | 100 | 100 | 100 | 100 | 100 |

TABLE 1-continued

| | | Example 41 Ink set 41 | | | | Example 42 Ink set 42 | | | | Example 43 Ink set 43 | | | | Example 44 Ink set 44 | | | | Example 45 Ink set 45 | | | |
|---|---|---|---|---|---|---|---|---|---|---|---|---|---|---|---|---|---|---|---|---|---|
| Composition | | 1Y | 1M | 1C | 1B | 2Y | 2M | 2C | 2B | 3Y | 3M | 3C | 3B | 4Y | 4M | 4C | 4B | 5Y | 5M | 5C | 5B |
| Color-ant | C.I. Pigment Yellow 74 | 6.0 | — | — | — | 6.0 | — | — | — | 6.0 | — | — | — | 6.0 | — | — | — | 6.0 | — | — | — |
| | C.I. Pigment Red 122 | — | 6.0 | — | — | — | 6.0 | — | — | — | 6.0 | — | — | — | 6.0 | — | — | — | 6.0 | — | — |
| | C.I. Pigment Blue 15:4 | — | — | 6.0 | — | — | — | 6.0 | — | — | — | 6.0 | — | — | — | 6.0 | — | — | — | 6.0 | — |
| | C.I. Pigment Black 6 | — | — | — | 6.0 | — | — | — | 6.0 | — | — | — | 6.0 | — | — | — | 6.0 | — | — | — | 6.0 |
| | Styrene-acrylic resin | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 |
| Alkane-diol | 4-Methyl-1,2-pentanediol | 4 | 4 | 4 | 4 | 3 | 3 | 3 | 3 | 3 | 3 | 3 | 3 | 3 | 3 | 3 | 3 | 2 | 2 | 2 | 2 |
| | 1,2-Octanediol | 2 | 2 | 2 | 2 | 1.5 | 1.5 | 1.5 | 1.5 | 1 | 1 | 1 | 1 | 2 | 2 | 2 | 2 | 1 | 1 | 1 | 1 |
| | 2-Butyl-2-methyl-1,3-propanediol | 2 | 2 | 2 | 2 | 1.5 | 1.5 | 1.5 | 1.5 | 2 | 2 | 2 | 2 | 1 | 1 | 1 | 1 | 2 | 2 | 2 | 2 |
| Surfac-tant | NONI 131 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Trimethylolpropane | — | — | — | — | — | — | — | — | — | — | — | — | — | — | — | — | — | — | — | — |
| | Triethanolamine | — | — | — | — | — | — | — | — | — | — | — | — | — | — | — | — | — | — | — | — |
| Pure water | Balance | Balance | Balance | Balance | Balance | Balance | Balance | Balance | Balance | Balance | Balance | Balance | Balance | Balance | Balance | Balance | Balance | Balance | Balance | Balance | Balance |
| | | 100 | 100 | 100 | 100 | 100 | 100 | 100 | 100 | 100 | 100 | 100 | 100 | 100 | 100 | 100 | 100 | 100 | 100 | 100 | 100 |

| | | Example 46 Ink set 46 | | | | Example 47 Ink set 47 | | | | Example 48 Ink set 48 | | | |
|---|---|---|---|---|---|---|---|---|---|---|---|---|---|
| Composition | | 1Y | 1M | 1C | 1B | 2Y | 2M | 2C | 2B | 3Y | 3M | 3C | 3B |
| Colorant | C.I. Pigment Yellow 74 | 6.0 | — | — | — | 6.0 | — | — | — | 6.0 | — | — | — |
| | C.I. Pigment Red 122 | — | 6.0 | — | — | — | 6.0 | — | — | — | 6.0 | — | — |
| | C.I. Pigment Blue 15:4 | — | — | 6.0 | — | — | — | 6.0 | — | — | — | 6.0 | — |
| | C.I. Pigment Black 6 | — | — | — | 6.0 | — | — | — | 6.0 | — | — | — | 6.0 |
| | Styrene-acrylic resin | 1.8 | 1.8 | 1.8 | 1.8 | 1.8 | 1.8 | 1.8 | 1.8 | 1.8 | 1.8 | 1.8 | 1.8 |
| Alkanediol | 4-Methyl-1,2-pentanediol | 2 | 2 | 2 | 2 | 2 | 2 | 2 | 2 | 2 | 2 | 2 | 2 |
| | 1,2-Octanediol | 2 | 2 | 2 | 2 | 1 | 1 | 1 | 1 | 0.5 | 0.5 | 0.5 | 0.5 |

TABLE 1-continued

| Composition | | 1Y | 1M | 1C | 1B | 2Y | 2M | 2C | 2B | 3Y | 3M | 3C | 3B | 4Y | 4M | 4C | 4B | 5Y | 5M | 5C | 5B |
|---|---|---|---|---|---|---|---|---|---|---|---|---|---|---|---|---|---|---|---|---|---|
| | | Example 49 Ink set 49 | | | | Example 50 Ink set 50 | | | | Example 51 Ink set 51 | | | | Example 52 Ink set 52 | | | | Example 53 Ink set 53 | | | |
| Colorant | C.I. Pigment Yellow 74 | 6.0 | — | — | — | 6.0 | — | — | — | 6.0 | — | — | — | 6.0 | — | — | — | 6.0 | — | — | — |
| | C.I. Pigment Red 122 | — | 6.0 | — | — | — | 6.0 | — | — | — | 6.0 | — | — | — | 6.0 | — | — | — | 6.0 | — | — |
| | C.I. Pigment Blue 15:4 | — | — | 6.0 | — | — | — | 6.0 | — | — | — | 6.0 | — | — | — | 6.0 | — | — | — | 6.0 | — |
| | C.I. Pigment Black 6 | — | — | — | 6.0 | — | — | — | 6.0 | — | — | — | 6.0 | — | — | — | 6.0 | — | — | — | 6.0 |
| | Fluorene resin | 2.4 / 2 | 2.4 / 2 | 2.4 / 2 | 2.4 / 2 | 2.4 / 2 | 2.4 / 2 | 2.4 / 2 | 2.4 / 2 | 2.4 / 2 | 2.4 / 2 | 2.4 / 2 | 2.4 / 2 | 1.8 / 4 | 1.8 / 4 | 1.8 / 4 | 1.8 / 4 | 1.8 / 3 | 1.8 / 3 | 1.8 / 3 | 1.8 / 3 |
| Alkanediol | 1,2-Pentanediol | 2 / 1 | 2 / 1 | 2 / 1 | 2 / 1 | 1 / 1 | 1 / 1 | 1 / 1 | 1 / 1 | 0.5 / 0.5 | 0.5 / 0.5 | 0.5 / 0.5 | 0.5 / 0.5 | 2 / 2 | 2 / 2 | 2 / 2 | 2 / 2 | 1.5 / 1.5 | 1.5 / 1.5 | 1.5 / 1.5 | 1.5 / 1.5 |
| | 1,2-Octanediol 2-Butyl-2-methyl-1,3-propanediol | | | | | | | | | | | | | | | | | | | | |
| Surfactant | NONI 131 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Trimethylolpropane | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 |
| | Triethanolamine | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 |
| | Pure water | Balance | Balance | Balance | Balance | Balance | Balance | Balance | Balance | Balance | Balance | Balance | Balance | Balance | Balance | Balance | Balance | Balance | Balance | Balance | Balance |
| | Balance | 100 | 100 | 100 | 100 | 100 | 100 | 100 | 100 | 100 | 100 | 100 | 100 | 100 | 100 | 100 | 100 | 100 | 100 | 100 | 100 |

| Composition | | Comparative Example 1 Ink set 49 | Comparative Example 2 Ink set 50 | Comparative Example 3 Ink set 51 | Comparative Example 4 Ink set 52 | Comparative Example 5 Ink set 53 |
|---|---|---|---|---|---|---|
| | | 1Y 1M 1C 1B | 2Y 2M 2C 2B | 3Y 3M 3C 3B | 4Y 4M 4C 4B | 5Y 5M 5C 5B |
| Colorant | C.I. Pigment Yellow 74 | 6.0 — — — | 6.0 — — — | 6.0 — — — | 6.0 — — — | 6.0 — — — |
| | C.I. Pigment Red 122 | — 6.0 — — | — 6.0 — — | — 6.0 — — | — 6.0 — — | — 6.0 — — |

TABLE 1-continued

| Composition | | | | | | | | | | | | |
|---|---|---|---|---|---|---|---|---|---|---|---|---|
| C.I. Pigment Blue 15:4 | — | — | — | — | 6.0 | — | — | — | — | 6.0 | — | 6.0 |
| C.I. Pigment Black 6 | — | 6.0 | — | — | — | — | — | — | 6.0 | — | 6.0 | — |
| Styrene-acrylic resin | 1.8 | 1.8 | 1.8 | 1.8 | 1.8 | 1.8 | 1.8 | 1.8 | 1.8 | 1.8 | 1.8 | 1.8 |
| 4-Methyl-1,2-pentanediol | 3 | 3 | 3 | 3 | 2 | 2 | 2 | 2 | 2 | 2 | 2 | 1 |
| 1,2-Octanediol | 3 | 3 | 3 | 3 | 2 | 2 | 2 | 2 | 1 | 1 | 1 | 1 |
| 2-Butyl-2-methyl-1,3-propanediol | 2 | 2 | 2 | 2 | 3 | 3 | 3 | 3 | 2 | 2 | 2 | 2 |
| Surfynol 465 | 0.1 | 0.1 | 0.1 | 0.1 | 0.1 | 0.1 | 0.1 | 0.1 | 0.1 | 0.1 | 0.1 | 0.1 |
| Trimethylolpropane | 8.0 | 8.0 | 8.0 | 8.0 | 8.0 | 8.0 | 8.0 | 8.0 | 8.0 | 8.0 | 8.0 | 8.0 |
| Triethanolamine | 0.9 | 0.9 | 0.9 | 0.9 | 0.9 | 0.9 | 0.9 | 0.9 | 0.9 | 0.9 | 0.9 | 0.9 |
| Pure water | Balance | Balance | Balance | Balance | Balance | Balance | Balance | Balance | Balance | Balance | Balance | Balance |
| | 100 | 100 | 100 | 100 | 100 | 100 | 100 | 100 | 100 | 100 | 100 | 100 |

| | Comparative Example 6 Ink set 54 | | | | Comparative Example 7 Ink set 55 | | | |
|---|---|---|---|---|---|---|---|---|
| Composition | 1Y | 1M | 1C | 1B | 2Y | 2M | 2C | 2B |
| C.I. Pigment Yellow 74 | 6.0 | — | — | — | 6.0 | — | — | — |
| C.I. Pigment Red 122 | — | 6.0 | — | — | — | 6.0 | — | — |
| C.I. Pigment Blue 15:4 | — | — | 6.0 | — | — | — | 6.0 | — |
| C.I. Pigment Black 6 | — | — | — | 6.0 | — | — | — | 6.0 |
| Styrene-acrylic resin | 1.8 | 1.8 | 1.8 | 1.8 | 1.8 | 1.8 | 1.8 | 1.8 |
| 4-Methyl-1,2-pentanediol | 1 | 1 | 1 | 1 | 1 | 1 | 1 | 1 |
| 1,2-Octanediol | 2 | 2 | 2 | 2 | 1 | 1 | 1 | 1 |
| 2-Butyl-2-methyl-1,3-propanediol | 1 | 1 | 1 | 1 | 1 | 1 | 1 | 1 |
| Surfynol 465 | 0.1 | 0.1 | 0.1 | 0.1 | 0.1 | 0.1 | 0.1 | 0.1 |
| Trimethylolpropane | 8.0 | 8.0 | 8.0 | 8.0 | 8.0 | 8.0 | 8.0 | 8.0 |
| Triethanolamine | 0.9 | 0.9 | 0.9 | 0.9 | 0.9 | 0.9 | 0.9 | 0.9 |
| Pure water | Balance | Balance | Balance | Balance | Balance | Balance | Balance | Balance |
| | 100 | 100 | 100 | 100 | 100 | 100 | 100 | 100 |

<Evaluation>
Viscosity of Ink

For each ink produced above, the viscosity was evaluated. Specifically, the viscosity of the ink was measured at 20° C. with a vibration-type viscometer (model number: MV 100, manufactured by YAMAICHI ELECTRONICS CO., LTD.), and the results were evaluated according to the following criteria.

S: Viscosity of less than 4 mPa·s
AA: Viscosity of not less than 4 mPa·s and less than 5 mPa·s
A: Viscosity of not less than 5 mPa·s and less than 6 mPa·s
B: Viscosity of not less than 6 mPa·s Uneven Coagulation of Ink In each ink produced above, ink 1Y, ink 1M, ink 1C and ink 1B were provided in combination to constitute ink set 1. Ink set 1 was loaded into an ink cartridge in an ink jet printer (PX-G900, manufactured by Seiko Epson Corporation), and printing was carried out on OK Top Coat+ (manufactured by Oji Paper Co., Ltd.) as printing paper for running-on with a resolution of 720×720 dpi. In this case, regarding printing conditions, the discharge rate of the ink was regulated so that, in a method for recording in a single direction that a resolution of 720×360 dpi is provided by one drive of the recording head, the dot weight was 9 ng. The drive head was 200 cps.

The recorded matters thus obtained were evaluated for unevenness of ink coagulation according to the following criteria.

A: Neither uneven coagulation nor overflow bleeding was observed with an ink weight of 4.0 mg/inch$^2$.
B: Neither uneven coagulation nor overflow bleeding was observed with an ink weight of 3.2 mg/inch$^2$.
C: Neither uneven coagulation nor overflow bleeding was observed with an ink weight of 2.4 mg/inch$^2$.
D: Neither uneven coagulation nor overflow bleeding was observed with an ink weight of 1.6 mg/inch$^2$.
E: Uneven coagulation and overflow bleeding were observed with an ink weight of 1.6 mg/inch$^2$.

Likewise, uneven coagulation was also evaluated for ink sets 2 to 55.

The same evaluation as described above was carried out, except that new YUPO FGS 110 (manufactured by YUPO Corporation) was used as a recording medium instead of OK top coat+ as printing paper for running-on.

The results of evaluation were as shown In Table 2 below.

Color Reproduction

Ink set 1 was loaded into an ink cartridge in the same ink jet printer as described above. "Futsushi Suisho, Kirei Modo (Plain Paper Recommended, Fine Mode)" was selected, and a full density blotted image was printed on Xerox P (manufactured by Xerox Corp.) with a resolution of 720×720 dpi under setting of "Without Gloss Optimizer." The printed matter was allowed to stand at 25° C. for 24 hr. The OD value of the recorded face was measured with SPM50 manufactured by Gretag Macbeth. The color reproducibility was evaluated according to the following criteria.

A: OD value of not less than 1.1
B: OD value of less than 1.1

Ink sets 2 to 55 were also evaluated for color reproducibility in the same manner as described just above. The results of evaluation were as shown in Table 2 below.

Ejection Stability

The above ink cartridge and ink jet printer were provided. A line pattern was continuously printed under conditions of temperature 40° C. and humidity 25%. The number of times of cleaning operation of the printer nozzle necessary for recovery to normal printing from ink dot missing and ink droplet trajectory directionality problem in 1000 printed sheets was measured. The results were evaluated according to the following criteria.

A: No ink dot missing occurred upon printing on 1000 sheets.
B: Upon printing on 1000 sheets, ink dot missing occurred, although no ink dot missing occurred upon printing on up to 500 sheets.
C: Ink dot missing occurred upon printing on 500 sheets.

The results were as shown in Table 2 below.

Anti-Clogging Property

The above ink cartridge and ink jet printer were provided. Printing was continuously carried out for 10 min to confirm that the ink was normally ejected through all the nozzles. Thereafter, in order to promote the dried state of ink in the nozzles, the ink cartridge was removed, and, in such a state that the record head was removed from the head cap, the ink cartridge was allowed to stand in an environment of temperature 40° C. and 20% RH for 48 hr.

After the standing, cleaning operation was repeated to determine the number of times of cleaning operation required for all the nozzles to normally eject the ink as in the initial state. The recovery from nozzle clogging was evaluated according to the following criteria.

A: Recovered to substantially the initial state by performing the cleaning operation once or twice.
B: Recovered to substantially the initial state by performing the cleaning operation three or four times.
C: Recovered to substantially the initial state by performing the cleaning operation five or six times.

The results of evaluation were as shown in Table 2 below.

TABLE 2

|  | Viscosity of ink | Uneven coagulation of Ink | | Color reproduction | Ejection stability | Anti-clogging property |
|---|---|---|---|---|---|---|
|  |  | OKT+ | Synthetic paper |  |  |  |
| Example 1 | AA | A | D | A | A | A |
| Example 2 | AA | A | D | A | A | A |
| Example 3 | AA | A | D | A | A | A |
| Example 4 | AA | A | D | A | A | A |
| Example 5 | S | A | D | A | A | A |
| Example 6 | S | A | D | A | A | A |
| Example 7 | S | A | D | A | A | A |
| Example 8 | S | A | D | A | A | A |
| Example 9 | AA | A | D | A | A | A |
| Example 10 | AA | A | D | A | A | A |
| Example 11 | AA | A | D | A | B | B |

TABLE 2-continued

|  | Viscosity of ink | Uneven coagulation of Ink OKT+ | Synthetic paper | Color reproduction | Ejection stability | Anti-clogging property |
|---|---|---|---|---|---|---|
| Example 12 | AA | A | D | A | B | B |
| Example 13 | S | A | D | A | B | B |
| Example 14 | S | A | D | A | B | B |
| Example 15 | S | A | D | A | A | A |
| Example 16 | S | A | D | A | A | A |
| Example 17 | AA | AA | C | A | A | A |
| Example 18 | AA | AA | C | A | A | A |
| Example 19 | AA | AA | C | A | A | A |
| Example 20 | AA | AA | C | A | A | A |
| Example 21 | S | AA | C | A | A | A |
| Example 22 | S | AA | C | A | A | A |
| Example 23 | S | AA | C | A | A | A |
| Example 24 | S | AA | C | A | A | A |
| Example 25 | AA | AA | C | A | A | A |
| Example 26 | AA | AA | C | A | A | A |
| Example 27 | AA | AA | C | A | B | B |
| Example 28 | AA | AA | C | A | B | B |
| Example 29 | S | AA | C | A | B | B |
| Example 30 | S | AA | C | A | B | B |
| Example 31 | S | AA | C | A | A | A |
| Example 32 | S | AA | C | A | A | A |
| Example 33 | AA | A | B | A | B | C |
| Example 34 | AA | A | B | A | B | C |
| Example 35 | AA | A | B | A | B | C |
| Example 36 | AA | A | B | A | B | C |
| Example 37 | S | A | B | A | B | C |
| Example 38 | S | A | B | A | B | C |
| Example 39 | S | A | B | A | B | C |
| Example 40 | S | A | B | A | B | C |
| Example 41 | AA | A | B | A | B | C |
| Example 42 | AA | A | B | A | B | C |
| Example 43 | AA | A | B | A | B | C |
| Example 44 | AA | A | B | A | B | C |
| Example 45 | S | A | B | A | B | C |
| Example 46 | S | A | B | A | B | C |
| Example 47 | S | A | B | A | B | C |
| Example 48 | S | A | B | A | B | C |
| Example 49 | S | A | D | A | A | A |
| Example 50 | S | A | D | A | A | A |
| Example 51 | S | A | D | A | A | A |
| Example 52 | S | A | D | A | A | A |
| Example 53 | AA | A | D | A | A | A |
| Comparative Example 1 | AA | C | E | A | C | B |
| Comparative Example 2 | AA | C | E | A | C | B |
| Comparative Example 3 | S | C | E | A | B | B |
| Comparative Example 4 | S | C | E | A | B | B |
| Comparative Example 5 | S | C | E | A | C | B |
| Comparative Example 6 | S | C | E | A | C | B |
| Comparative Example 7 | S | C | E | A | C | B |

The invention claimed is:

1. An ink composition for ink jet recording, comprising a colorant, water, an alkanediol, and a surfactant, wherein
the alkanediol comprises a water-soluble 1,2-alkanediol, a poor water-soluble 1,2-alkanediol, and a poor water-soluble alkanediol having a hydroxyl group at both ends of its main chain, and
the alkanediol satisfies a requirement on a weight basis of A:(B+C)=2:1 to 2:3 wherein A represents the content of the water-soluble 1,2-alkanediol in the alkanediol; B represents the content of the poor water-soluble 1,2-alkanediol in the alkanediol; and C represents the content of the poor water-soluble alkanediol having a hydroxyl group at both ends of its main chain in the alkanediol.

2. The ink composition for ink jet recording according to claim 1, wherein the colorant comprises a pigment and a dispersing agent which can disperse the pigment in the ink.

3. The ink composition for ink jet recording according to claim 1, wherein the colorant comprises a dispersing agent which can dissolve the poor water-soluble solvent in the ink composition.

4. The ink composition for ink jet recording according to claim 1, wherein the water-soluble 1,2-alkanediol has 6 or less carbon atoms.

5. The ink composition for ink jet recording according to claim 4, wherein the water-soluble 1,2-alkanediol is 1,2-pentanediol.

6. The ink composition for ink jet recording according to claim 1, wherein the water-soluble 1,2-alkanediol has one or two substituents on its main chain.

7. The ink composition for ink jet recording according to claim 1, wherein the poor water-soluble alkanediol having a hydroxyl group at both ends of its main chain has one or two substituents on its main chain.

8. The ink composition for ink jet recording according to claim 3, wherein the content ratio between the water-soluble 1,2-alkanediol and the poor water-soluble 1,2-alkanediol is A:B=2:1 to 4:1.

9. The ink composition for ink jet recording according to claim 3, wherein the content ratio between the water-soluble 1,2-alkanediol and the poor water-soluble alkanediol having a hydroxyl group at both ends of its main chain is A:C=2:1 to 4:1.

10. The ink composition for ink jet recording according to claim 6 or 7, wherein all the substituents in the water-soluble 1,2-alkanediol and the poor water-soluble alkanediol having a hydroxyl group at both ends of its main chain are an alkyl group.

11. The ink composition for ink jet recording according to claim 1, which contains 2.0 to 12.0% by weight of the total amount of the water-soluble 1,2-alkanediol, the poor water soluble 1,2-alkanediol, and the poor water-soluble alkanediol having a hydroxyl group at both ends of its main chain.

12. The ink composition for ink jet recording according to claim 2, wherein the dispersing agent comprises at least one resin selected from the group consisting of styrene-acrylic acid copolymer resins, urethane resins, and fluororesins.

13. The ink composition for ink jet recording according to claim 12, wherein the content of the dispersing agent is 10 to 200 parts by weight based on 100 parts by weight of the pigment.

14. The ink composition for ink jet recording according to claim 1, wherein the surfactant has a dynamic surface tension at 1 Hz of not more than 26 mN/m in the form of an aqueous solution comprising 20% by weight of glycerin, 10% by weight of 1,2-hexanediol, 0.1% by weight of the surfactant, and 69.9% by weight of water.

15. The ink composition for ink jet recording according to claim 14, wherein the surfactant is a polyorganosiloxane surfactant.

16. The ink composition for ink jet recording according to claim 15, wherein the polyorganosiloxane comprises one or at least two compounds represented by the following formula:

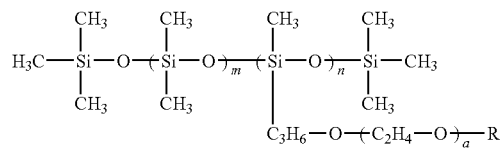

wherein R represents a hydrogen atom or a methyl group; a is an integer of 2 to 11; m is an integer of 2 to 50; and n is an integer of 1 to 5.

17. The ink composition for ink jet recording according to claim 1, which further comprises an organic amine and/or an inorganic amine.

18. The ink composition for ink jet recording according to claim 17, wherein the organic amine is a tertiary amine.

19. The ink composition for ink jet recording according to claim 1, which is substantially free from a wetting agent and/or an organic amine.

20. The ink composition for ink jet recording according to claim 19, which is substantially free from a wetting agent and/or an organic amine that are liquid at 20° C.

21. A method for ink jet recoding, comprising the step of ejecting droplets of an ink composition and depositing the droplets onto a recording medium to perform printing, wherein the ink composition is an ink composition for ink jet recording according to claim 1.

22. The method according to claim 21, which comprises a steam washing step.

23. The method according to claim 21 or 22, wherein the recording medium is a synthetic paper composed mainly of a synthetic resin, or printing paper having a coating layer with poor ink absorbability.

24. The method according to claim 23, wherein the synthetic paper or printing paper having a coating layer with poor ink absorbability comprises an ink receptive layer comprising polyisocyanate and/or polyamine.

25. The method according to claim 21, wherein droplets of an ink composition are ejected so that dots are arranged alternately in a direction perpendicular to the scanning direction of a recording head.

26. A recorded matter recorded by a method for ink jet recording according to claim 21.

* * * * *